United States Patent Office 3,495,385
Patented Feb. 17, 1970

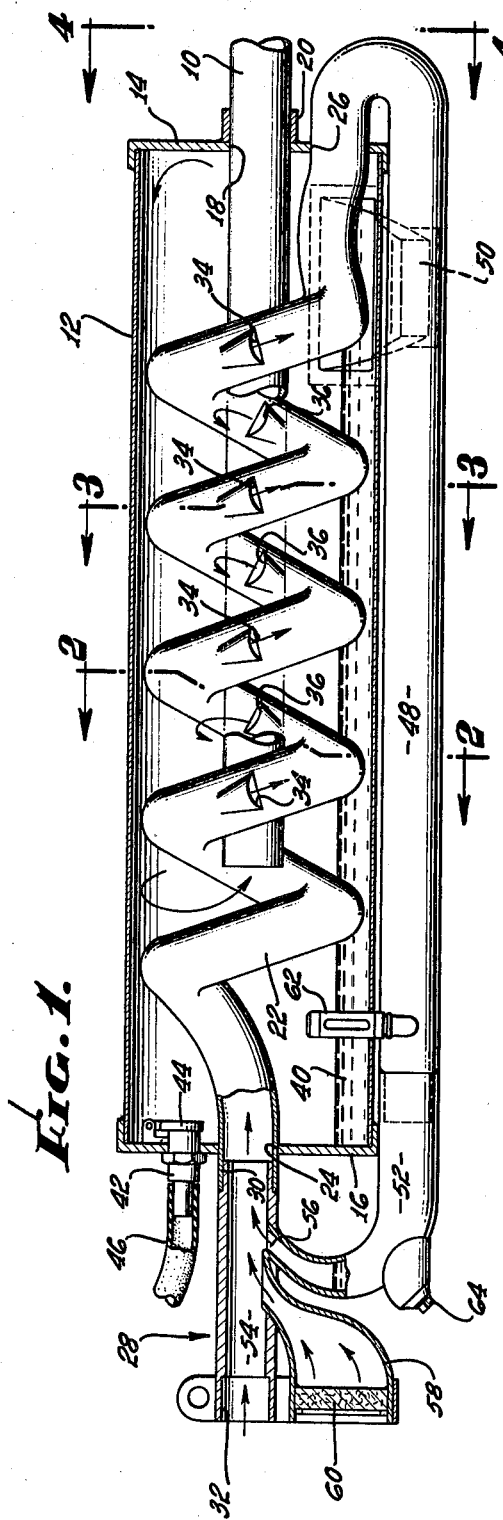

3,495,385
AIR POLLUTION CONTROL DEVICE
Adolph C. Glass, 20146 Hart St.,
Canoga Park, Calif. 91306
Filed Aug. 21, 1967, Ser. No. 662,151
Int. Cl. B01d 47/10
U.S. Cl. 55—237
8 Claims

ABSTRACT OF THE DISCLOSURE

A gas purifying device for an internal combustion engine being provided with an apertured helical pipe delivering exhaust gases and extending for a portion of its length about the clean gas outlet pipe of the device and a conduit delivering decontaminating liquid from the device to the helical pipe.

BRIEF SUMMARY OF THE INVENTION

This invention relates to apparatus for removing air pollutants such as ordinarily found in the exhaust gases of an internal combustion engine.

In general, it has been recognized that pollutants can be removed from gases by washing the gases in suitable liquid solutions. Various attempts have been made to make devices relying on this principle of operation. Various difficulties have been encountered: excessive back pressure is imposed on the exhaust manifold, and engine operation is adversely affected; various pump and other mechanisms constantly need servicing or repair; various mesh type devices constantly need cleaning or replacement. It is an object of this invention to provide a new apparatus for removing air pollutants by an absorption process free of the foregoing disadvantages.

Another object of this invention is to provide a device of this character which imposes no significant back pressure on the exhaust gases yet effectively causes separation of impurities by a liquid absorption process.

Another object of this invention is to provide novel means for injecting liquid particles into the exhaust stream and precipitating the liquid particles therefrom, all without the use of any auxiliary power or moving equipment. For this purpose, I use the energy of the exhaust gases themselves, first to entrain the liquid particles by a Venturi effect, and secondly to precipitate the liquid particles for re-use by centrifugal action.

Another object of this invention is to provide means for ensuring against substantial evaporative loss of the absorption liquid whereby it need be replenished only at relatively infrequent intervals. For this purpose, an auxiliary air intake is provided to cool the exhaust gases prior to injection of the absorption liquid.

This invention possesses many other advantages and has other objects which may be made more clearly apparent from a consideration of one embodiment of the invention. For this purpose, there is shown a form in the drawings accompanying and forming a part of the present specification, and which drawings are true scale. This form will now be described in detail, illustrating the general principles of the invention.

DESCRIPTION OF THE DRAWINGS

FIG. 1 is an axial sectional view of a precipitator incorporating the present invention;

FIGS. 2 and 3 are sectional views taken along planes corresponding to lines 2—2 and 3—3 of FIG. 1 respectively; and FIG. 4 is an end view taken in a direction indicated by the arrows 4—4 of FIG. 1, a portion of the apparatus being broken away and shown in section.

DETAILED DESCRIPTION

The apparatus shown is designed to be inserted into the conventional exhaust pipe of an automobile for treatment of the exhaust gases. One section 10 of the exhaust pipe serves as a support for one end of the apparatus. Thus the apparatus includes a generally cylindrical housing 12 having end brackets 14 and 16 at opposite ends. The bracket 14 has a central opening 18 telescoped over the pipe section 10. A sleeve 20 secured to the bracket 14 forms an extension of the opening 18 and serves as a bearing between the apparatus and the exhaust pipe section 10. The pipe section 10 may be suspended from the automobile frame by suitable means (not shown).

The exhaust pipe section 10 projects axially into the housing 12 and terminates just short of the opposite bracket 16. The end of the pipe section 10 is freely in communication with exhaust gases that may enter the housing 12. The exhaust gases enter the housing through a helical intake pipe 22. One end of the intake pipe 22 projects through and is fitted in a central aperture 24 of the end bracket 16. The intake pipe 22 coils helically about the interior of the housing 12 and the exhaust pipe section 10. The other end of the intake pipe 22 passes through an aperture 26 in the lower end of the end bracket 14 and then returns beneath the housing to the intake end of the device for purposes hereinafter to be described.

An intake pipe 28 serves as a connector between the forward section of the exhaust pipe (not shown) and the projecting end of the intake pipe 22. Thus the pipe 28 has at one end, a reduced extension 30 fitting into the intake pipe 22, and at the other end a counterbore 32 for receiving the forward exhaust pipe section (not shown).

Exhaust gases pass from the intake pipe 22 to the interior of the housing 12 (FIGS. 2 and 3) via a series of openings 34 on the periphery of the pipe 22 and via a series of openings 36 on the inside of the pipe 22. The first openings formed on the pipe 22 are located rearwardly of the opening of the exhaust pipe section 10 whereby the exhaust gases must undergo a reversal in direction before leaving the housing 12.

The openings 34 and 36 are formed in any suitable manner. In the present instance the openings are formed by generally transverse slits in the pipe 22 with the material on the upstream side as at 38 and 66 bent outwardly to impart segment shape to the openings. The outwardly bent parts 38 and 66 smoothly guide the exhaust gases outwardly of the pipe 22.

The end of the intake pipe 22 is closed by a body of absorption liquid 40 in the housing. The liquid is admitted via fitting 42 having a check valve closure 44. A hose 46 conducts the liquid from an accessible location to the housing 12 which normally is relatively inaccessible. The liquid 40 may be a mixture of water, chlorides of nickel, lead, iron, copper, sodium hydroxide, ammonium hydroxide, methanol and ethanol well known in the art for achieving absorption of air pollution components.

The liquid 40 is conducted to the return duct portion 48 of the intake pipe 22 by the aid of a fitting 50 (FIG. 4). The end of the return duct 48 connects to a conduit 52 of the intake bracket 28. The conduit 52 in turn intersects a tubular passage 54 that joins the ends of 30 and 32 of the fitting 28. The current of exhaust gases, by a Venturi effect at the conduit opening 56 creates a strong vacuum that causes particles of the liquid 66 to be entrained in the influent gases for intimate and thorough exposure thereto. Due to the centrifugal action, the liquid is expelled along the openings 34 for return to the main body of liquid in the housing 12, but not before the liquid has been sufficiently exposed to the exhaust gases to absorb air pollutants.

By the time the exhaust gases reach the openings 34, the exhaust gases are sufficiently cool to ensure nearly 100% return of the liquid. In order to assist in the cooling of exhaust gases, a scoop 58 is provided forming a part of the intake bracket 28. Clean air is injected into the passage 54 just ahead of the Venturi opening 56, preventing the liquid from flashing into a high temperature vapor. A loose filter cake 60 may be detachably held in the mouth of the scoop 58. In place of a scoop, a blower could be provided to induce a suitable current of air such as would be required in commercial or industrial installations where the device would be immobile.

Periodically the absorption liquid must be replenished as it slowly evaporates. A suitable remote indicating gauge of conventional form may be used. In the present instance, a simple gauge 62 (FIG. 4) is attached to the side of the return duct 48. The liquid may be drained through a fitting 64.

The apparatus shown imposes no significant back pressure on the exhaust since no severe restriction is interposed between the intake fitting and the exhaust pipe section 10. The absorption liquid is picked up and returned by utilization of the kinetics of the exhaust gases themselves without requiring any pumps or moving mechanisms. An efficient, trouble-free apparatus is thus provided.

I claim:

1. In apparatus of the class described:

(a) a housing adapted to contain a decontaminating liquid;

(b) an exhaust pipe section extending into the housing and having an opening at its inner end for conducting decontaminating gases outwardly of the housing;

(c) an intake pipe projecting into the housing for conducting gases itno the housing, said intake pipe having a part extending substantially helically about said exhaust pipe sections, said intake pipe part having a plurality of discharge openings located in spaced relationship along its length in unrestricted communication with said exhaust pipe section opening; and (d) conduit means for conducting said decontamating liquid to said intake pipe in advance of said helically extending part, said conduit means terminating at a Venturi orifice for entraining liquid into the influent stream of gases and for subsequent return to said housing through said discharge openings.

2. The combination as set forth in claim 1 together with an air scoop allowing air into said intake pipe ahead of said conduit means for precooling the influent gases prior to contact with said decontaminating liquid.

3. The combination as set forth in claim 1 in which said discharge openings are located on that portion of said intake that surrounds said exhaust pipe section whereby effluent gases are required to undergo a reversal in direction.

4. The combination as set forth in claim 1 in which said intake pipe has a return duct extending along the bottom of said housing and forming a circuitous loop; and means conducting liquid to said return duct.

5. In apparatus of the class described:

(a) a housing adapted to contain a decontaminating liquid;

(b) an exhaust pipe section extending into the housing and having an opening at its inner end for conducting decomtaminated gases outwardly of the housing;

(c) an intake pipe projecting into the housing for conducting gases into the housing, said intake pipe having a part extending substantially helically about said exhaust pipe section, said intake pipe part having a plurality of discharge openings located in spaced relationship along its length in unrestricted communication with said exhaust pipe section opening; said intake pipe being circular in cross-section and said discharge openings each being formed by a transverse planar cut slit in said pipe with an outwardly bent portion adjoining said slit only on the upstream side of the slit; and (d) conduit means for conducting said decontaminating liquid to said intake pipe in advance of said helically extending part, said conduit means terminating at a Venturi orifice for entraining liquid into the influent stream of gases and for subsequent return to said housing through said discharge opening.

6. The combination as set forth in claim 1 together with means allowing air into the intake pipe ahead of said conduit means for precooling the influent gases prior to contact with said decontaminating liquid.

7. The combination as set forth in claim 1 in which at least a substantial portion of said discharge openings are located on the outside of the helical turns of said intake pipe.

8. In apparatus of the class described:

(a) a substantially cylindrical housing having end brackets and adapted to contain a decontaminating liquid;

(b) an exhaust pipe section extending through the center of one end bracket and projecting axially toward, but terminating short of, the opposite end bracket;

(c) an intake pipe extending inwardly of said housing from the said opposite end bracket, said intake pipe having a substantially helically coiled section extending substantially throughout the length of said housing and in exterior encompassing relationship with said exhaust pipe section; said intake pipe having a return duct section extending through said one end bracket and returning beneath said housing; said intake pipe having a series of discharge openings spaced along its coiled section at the region of said exhaust pipe section whereby the effluent gases undergo a change in direction, said discharge openings being formed by transverse slits in said pipe and outwardly bent portions adjoining said slits on the upstream sides of said slits, a substantial portion of said discharge openings being located on the outside of the helical turns of said intake pipe;

(d) means connecting said return duct portion to the lower portion of said housing for flow of liquid thereto; and (e) an intake fitting having a passage adapted at one end to register with said intake pipe, and at the other end to register with a companion exhaust pipe section; said intake fitting having conduit means connecting the end of said return duct to an opening intermediate the ends of said passage for injection of said liquid into the stream of gases through said passage and for subsequent return to said housing through said discharge openings; said intake fitting also having an air scoop for allowing air into said passage ahead of said conduit means for precooling the influent gases prior to contact with said decontaminating liquid.

(References on following page)

References Cited

UNITED STATES PATENTS

| | | |
|---|---|---|
| 1,421,432 | 7/1922 | Embanks. |
| 1,661,980 | 3/1928 | Voigt _____ 181—66 |
| 1,791,912 | 2/1931 | Story _____ 60—31 |
| 2,024,834 | 12/1935 | Rippe _____ 60—30 |
| 2,740,491 | 4/1956 | Vecchio _____ 55—247 |
| 2,787,119 | 4/1957 | Giambruno. |
| 3,139,331 | 6/1964 | Boudreau _____ 55—237 |
| 3,253,400 | 5/1966 | Hass _____ 60—30 |
| 3,353,335 | 11/1967 | Caballero _____ 60—30 |
| 3,372,540 | 3/1968 | Birdwell _____ 60—30 |

FOREIGN PATENTS 382,438   10/1932   Great Britain.

HARRY B. THORNTON, Primary Examiner

BERNARD NOZICK, Assistant Examiner

U.S. Cl. X.R.

55—261, 267, 458, 468; 60—30, 31; 181—67